(12) United States Patent
Baum

(10) Patent No.: US 11,840,467 B2
(45) Date of Patent: Dec. 12, 2023

(54) SURFACE WATER BIOSOURCE AUGMENTATION PRODUCTION AND DISTRIBUTION SYSTEM

(71) Applicant: Rigero LLC, Plymouth, MI (US)

(72) Inventor: Richard Baum, Plymouth, MI (US)

(73) Assignee: Rigero LLC, Plymouth, MI (US)

( * ) Notice: Subject to any disclaimer, the term of this patent is extended or adjusted under 35 U.S.C. 154(b) by 650 days.

(21) Appl. No.: 16/969,295

(22) PCT Filed: Feb. 12, 2019

(86) PCT No.: PCT/US2019/017590
§ 371 (c)(1),
(2) Date: Aug. 12, 2020

(87) PCT Pub. No.: WO2019/160839
PCT Pub. Date: Aug. 22, 2019

(65) Prior Publication Data
US 2020/0399155 A1    Dec. 24, 2020

Related U.S. Application Data

(60) Provisional application No. 62/775,365, filed on Dec. 4, 2018, provisional application No. 62/630,119, filed on Feb. 13, 2018.

(51) Int. Cl.
*C02F 7/00* (2006.01)
*C02F 3/10* (2023.01)
*C02F 103/00* (2006.01)

(52) U.S. Cl.
CPC ............... *C02F 3/101* (2013.01); *C02F 7/00* (2013.01); *C02F 2103/007* (2013.01); *C02F 2203/006* (2013.01)

(58) Field of Classification Search
None
See application file for complete search history.

(56) References Cited

U.S. PATENT DOCUMENTS 5,326,475 A * 7/1994 Kent ................... C02F 3/101
                                                         210/615
5,353,745 A * 10/1994 Fahs, II ................ A01K 63/04
                                                         119/226

(Continued)

FOREIGN PATENT DOCUMENTS

CN    102577922 1    7/2012
EP       0546881 A1    6/1993
(Continued)

OTHER PUBLICATIONS

Supplementary EP Search Report issued for corresponding EP Patent Appln. No. EP19754392, dated Oct. 8, 2021.
Int'l. Search Report for PCT/US2019/017590, dated May 27, 2019.

*Primary Examiner* — Chester T Barry
(74) *Attorney, Agent, or Firm* — MaxGoLaw PLLC

(57) ABSTRACT

A modular system for aeration and biosource augmentation of a body of water and a method of using the system to prevent or eliminate an algal bloom in a water body include one or more mechanical basins located outside the body of water and at least two of: one or more residence pods submerged in the body of water that aerate the body of water, dose beneficial biosource, host biosource, and provide biosource to the body of water; one or more residence air pods submerged in the body of water that aerate the body of water, host beneficial bacteria, and provide beneficial bacteria to the body of water; and one or more residence nano pods submerged in the body of water that host, the one or more residence pods or the one or more residence air pods in fluid communication with the one or more mechanical basins.

19 Claims, 11 Drawing Sheets

(56) References Cited

U.S. PATENT DOCUMENTS

| | | | |
|---|---|---|---|
| 5,534,141 A | | 7/1996 | McAnaney et al. |
| 5,549,828 A | * | 8/1996 | Ehrlich .................... C02F 3/06 |
| | | | 210/620 |
| 5,908,555 A | * | 6/1999 | Reinsel ................. C02F 3/2806 |
| | | | 210/903 |
| 6,344,144 B1 | | 2/2002 | Long et al. |
| 6,780,318 B2 | * | 8/2004 | Fife ......................... C02F 3/306 |
| | | | 210/170.08 |
| 8,137,557 B2 | * | 3/2012 | Ladouceur ........ B01F 23/23121 |
| | | | 210/615 |
| 11,186,505 B1 | * | 11/2021 | Anderson ............. C02F 3/2866 |
| 2004/0124138 A1 | | 7/2004 | Veilleux et al. |
| 2007/0000825 A1 | | 1/2007 | Boyd |
| 2007/0039878 A1 | * | 2/2007 | Roberts ............. B01F 23/23421 |
| | | | 210/605 |
| 2008/0017574 A1 | | 1/2008 | Lenger et al. |
| 2010/0238025 A1 | * | 9/2010 | Verhulst ................... G01N 1/08 |
| | | | 340/539.22 |
| 2018/0050942 A1 | * | 2/2018 | Yan ......................... C02F 3/322 |

FOREIGN PATENT DOCUMENTS

| | | |
|---|---|---|
| GB | 2366523 A | 3/2002 |
| WO | 2004009496 A2 | 1/2004 |
| WO | 2006029481 A2 | 3/2006 |

* cited by examiner

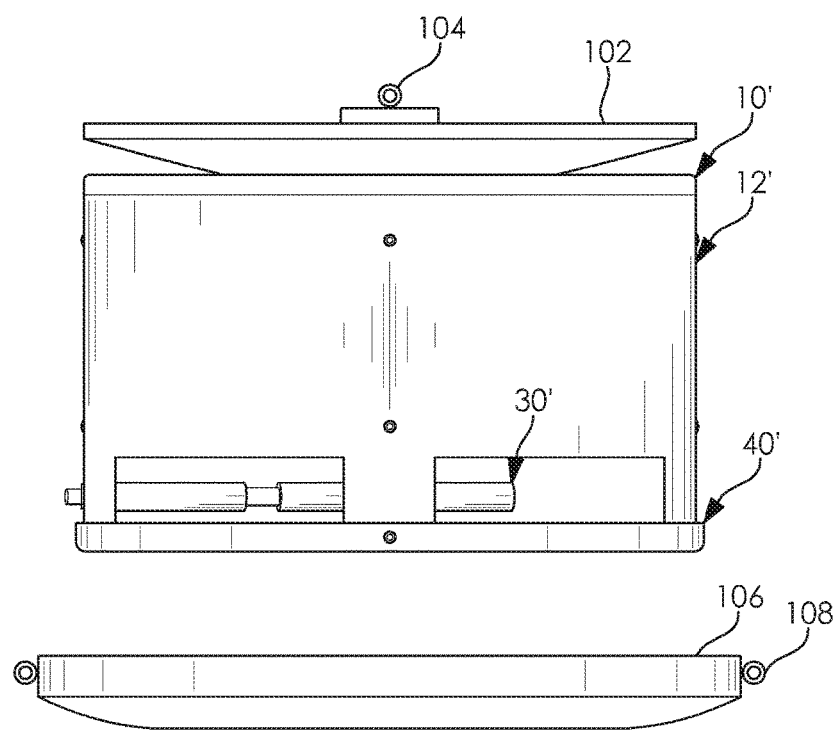
FIG. 10
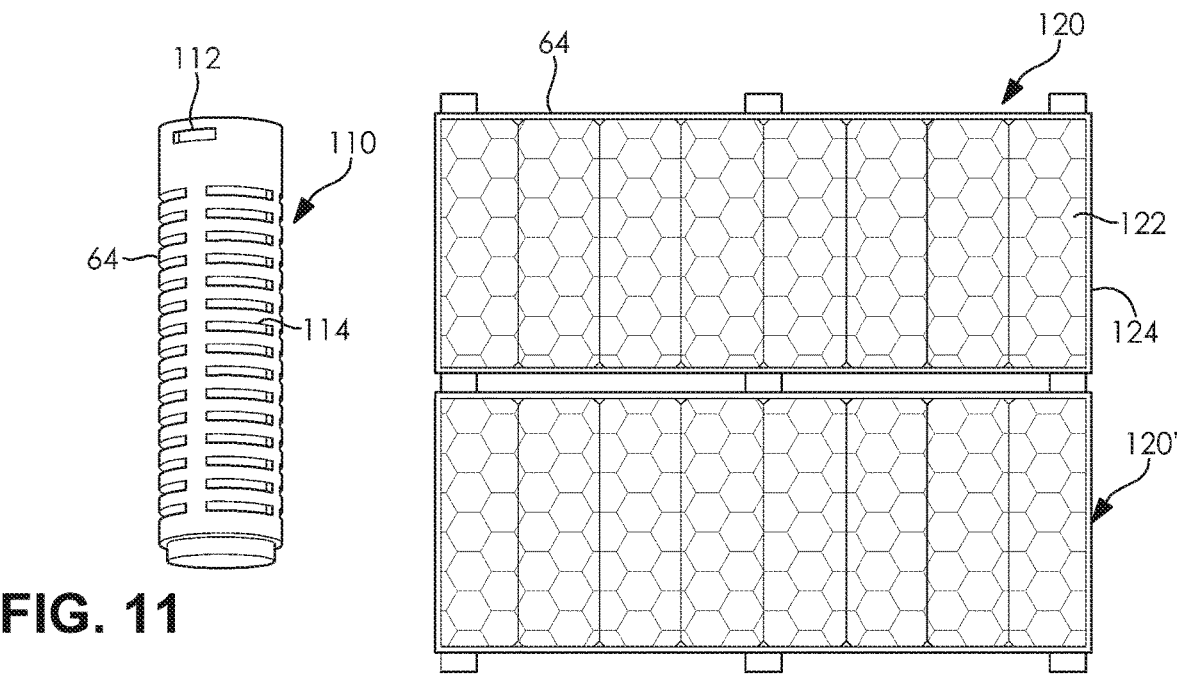
FIG. 11
FIG. 12A

SURFACE WATER BIOSOURCE AUGMENTATION PRODUCTION AND DISTRIBUTION SYSTEM

RELATED APPLICATIONS

This application is a non-provisional application that claims priority benefit of U.S. Provisional Application Ser. No. 62/630,119 filed Feb. 13, 2018 and U.S. Provisional Application Ser. No. 62/775,365 filed Dec. 4, 2018; the contents of which are hereby incorporated by reference.

TECHNICAL FIELD

The present invention generally relates to the field of water treatment, and more specifically to a system and method for biosource augmentation and aeration of standing bodies of water such as ponds, lakes, or waste water reservoirs.

BACKGROUND

Algal bloom is a rapid increase or accumulation in the population of algae in freshwater or marine water systems. Algal blooms are characterized by the discoloration in the water sources resulting from pigments released by the algae. Freshwater algal blooms typically result from an excess of nutrients such as phosphates that originate from fertilizers that are applied to land for agricultural or recreational purposes, and may also originate from household cleaning products containing phosphorus. When phosphates are introduced into water systems, the higher nutrient concentrations cause increased growth of algae and plants. In addition excess carbon and nitrogen are also suspected as causes of algal blooms. The presence of residual sodium carbonate also acts as catalyst for the algae to bloom by providing dissolved carbon dioxide for enhanced photosynthesis in the presence of nutrients. The excess nutrients that support algal blooms enter watersheds through water runoff.

As algal blooms grow, the algal blooms deplete the oxygen in the water and block sunlight from reaching fish and plants. Algal blooms can last from a few days to many months. With less light, plants beneath the bloom can die and fish can starve. While algae tend to grow very quickly under high nutrient availability, each alga is short-lived, and the result is a high concentration of dead organic matter which starts to decay and form a muck. The microbes which decompose the dead algae use up even more dissolved oxygen in the water, resulting in hypoxic conditions, which in turn causes more fish to die or leave the area. Without sufficient dissolved oxygen in the water, animals and plants continue to die off in large numbers.

Man-made efforts to control an outbreak of algal bloom have included the use of algaecides for killing algae, and have been used mostly in small bodies of water. For large algal blooms, however, adding algaecides such as silver nitrate or copper sulfate can have worse effects, such as killing fish outright and harming other wildlife. The negative effects can therefore be worse than letting the algae die off naturally.

In addition, biosource augmentation, bacteria grow/filtration media, and aeration have been used in lakes, ponds, and wastewater treatment to combat algal blooms. Bacterial augmentation typically involves the application of a blend of beneficial bacteria to the water. There are numerous blends of various strains of bacteria available in a variety of forms including, liquid, powder, pellets, disks, and others. There are also systems that promote growth of native bacteria already present in the water, as well as the commercially produced blends of beneficial bacteria. Bacterial grow/filtration media is most commonly found in fish ponds and waste water treatment applications. Growth media provides a place for beneficial bacteria cultures to live and produce. Aeration is another key component in pond and lake management for prevention of algae build up. Aeration systems increase dissolved oxygen levels in treated water and in so doing promote healthy aquatic life and improved water quality, as well as promoting the growth of beneficial bacteria.

While there are available methods for management of bacterial growth and prevention of algal blooms in ponds and lakes, there continues to be a need for methods and systems that improve biosource augmentation treatments in lakes and ponds. There also exists a need for a system to reduce decomposing organic material muck in surface water bodies such as lakes and ponds.

SUMMARY

A modular system for aeration and biosource augmentation of a body of water is provided. According to embodiments the modular system includes one or more mechanical basins located outside the body of water and at least two of: one or more residence pods submerged in the body of water that aerate the body of water, dose beneficial biosource, host biosource, and provide biosource to the body of water; one or more residence air pods submerged in the body of water that aerate the body of water, host beneficial bacteria, and provide beneficial bacteria to the body of water; and one or more residence nano pods submerged in the body of water that host a biosource, the one or more residence pods or the one or more residence air pods in fluid communication with the one or more mechanical basins.

A method of using a modular system for aeration and biosource augmentation of a body of water to prevent or eliminate an algal bloom in a water body is also provided. According to embodiments, the method includes positioning one or more mechanical basins along the outside of the water body, connecting one or more residence pods to the one or more mechanical basins with a first set of one or more tubes for supplying air and a second set of one or more tubes for supplying biosource to the residence pods, connecting the one or more residence air pods to the one or more mechanical basins with the first set of one or more tubes for supplying air to the residence air pods, and submerging the one or more residence pods and the one or more residence air pods in the body of water.

BRIEF DESCRIPTION OF THE DRAWINGS

The present invention is further detailed with respect to the following drawings that are intended to show certain aspects of the present invention, but should not be construed as a limit on the practice of the invention, wherein:

FIG. 10 is a side view of a residence pod in accordance with another embodiment of the invention;

FIG. 11 is a perspective view a bio source cartridge;

FIGS. 12A and 12B are schematics of a circular array of pods for containing bacteria growth media, in side view stacked in modular form with a duplicate array (FIG. 12A), and a top view of the array (FIG. 12B);

DETAILED DESCRIPTION OF THE INVENTION

Figure 1A:
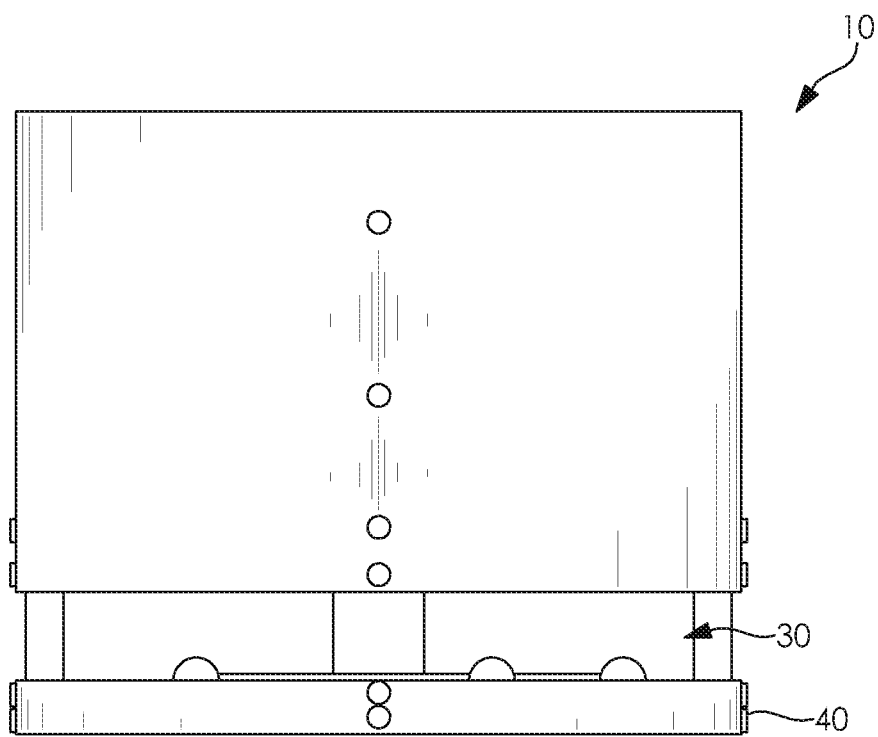
FIG. 1A is a side view of a residence pod in accordance with embodiments of the invention.

The present invention has utility as a modular system and method that improves aeration and biosource augmentation treatments in lakes and ponds. In a specific inventive embodiment the system includes three units: a biosource dosing, hosting, aeration, and distribution unit herein referred to as a "residence pod;" a biosource hosting, aeration, and distribution unit referred to herein as a "residence air pod;" and a biosource hosting and distribution unit referred to as a "residence nano pod." Inventive embodiments of the modular treatment systems may be installed in lakes and ponds to provide an ongoing supply of commercially available blends of biosource designed to effectively consume and digest organic material "muck" that builds up on the bottom of these bodies of water. Additionally, embodiments of the inventive modular treatment system insure a constant supply of beneficial bacterial that consume and digest available nutrients in the body of water.

As used herein, a "biosource" is defined as microorganisms, insect larvae, enzymes, nutrients to promote bacterial growth, or a combination thereof capable of digesting organic muck sediment. In some embodiments, a microorganism is aerobic bacteria that thrive in the aqueous environment. It is appreciated that the surface water defining the aqueous environment is fresh water, brackish, or salt water.

As used herein, the terms "pod" and "pod unit" are used synonymously.

Embodiments of the inventive residence pod unit incorporate aeration, biosource augmentation, and grow/filtration media. A residence pod unit is connected to a mechanical basin containing at least an air compressor to provide aeration fluid communication to other system components. In still other inventive embodiments, the mechanical basin has a liquid biosource reservoir, nutrient reservoir, or combination thereof in fluid communication with a doser pump that is located out of the body of water being treated to meter surface water active organisms to the other system components. The air compressor delivers a continuous flow of air through tubing to one or more diffusers. The doser pump delivers metered quantities of the biosource through tubing to a dose receptacle. The organism metering being automatic and continuous, on set intervals, or based on a preselected program as to timing and amounts delivered. A set of air diffusers that are located near the bottom of the residence pod unit generate a continuous supply of small bubbles that move upward through a flow chamber drawing water through a bottom water intake and out through the top. Another diffuser located under the grow chamber generates an ongoing supply of small bubbles traveling upward, providing oxygen for growth of bacteria and also drawing nutrient rich water that provides food for bacteria. This nutrient rich water full of bacteria flows from the grow chamber into the flow chamber where it joins the flow upward, out of the unit, and into the open water. The residence pod unit continuously produces and distributes the bacteria, some of which may consume nutrients in a water column of the body of water while other bacteria may consume muck build up on the bottom of the body of water.

Embodiments of the inventive residence air pod unit incorporate aeration, and grow/filtration media. In embodiments of the residence air pod unit, the grow media provides an ideal place for both native beneficial bacteria as well as the biosource, such as bacteria traveling from other residence pods that are in the vicinity to grow. A mechanical basin containing an air compressor delivers continuous flow via tubing to one or more diffusers. The diffuser(s) are located near the bottom of the residence air pod unit and produce small bubbles that move upward and discharge from the residence air pod unit at the top. These bubbles deliver oxygen that promote bacterial growth in the grow media while creating a flow through of water. As this water flows through the residence air pod unit biosource treats the water. This treated water, full of biosource, flows into the open water. The residence air pod unit continuously produces and distributes the biosource, some of which consumes nutrients in the water column of the body of water, while other beneficial bacteria consume muck build up on the bottom of the body of water. The combining of aeration and grow media into a single unit is a significant innovation not found in prior algal treatment solutions.

Embodiments of the inventive residence nano pod unit have a base with grow/filtration media. The inventive residence nano pod units reside underwater and provide a place for native beneficial bacteria or beneficial bacteria, or other forms of biosource, if present, from other residence pods, residence nano pod units, or a combination thereof to grow. Natural water movement provides some oxygen and flow through the residence nano pod units that result in distribution of the beneficial bacteria into the surrounding area. Each unit has a mechanical fastener, such as an eye bolt for attaching cables and connecting strings of units together. Such fasteners are readily supplied on two sides of a given pod unit. One cable extends from the string to the shore and out of the lake. This cable system provides a way to locate and service residence nano pods by simply following the cables.

Each of the aforementioned types of pods, each individual pod independently is weighted to reside on the bottom of the body of water, tethered to the bottom and has buoyancy, is mounted to a pole or other substrate in a submerged position, or suspended in a submerged position from a buoy. It is appreciated that an inventive system include different types of suspension or bottom positions pods functioning together in a single inventive system.

In inventive embodiments of the residence pod system, each of the different units (residence pod, residence air pod, residence nano pod) may work independently and provide treatment benefits to a body of water illustratively including a lake or pond. However, it is the combined use of all the units together that result in a broadest and most effective and powerful impact on reducing muck and nutrient levels in a body of water. Embodiments of the inventive residence pods produce and distribute the greatest amount of biosource that treats the water and find their way to other residence units. Embodiments of the inventive residence air pods also host, grow, and distribute, beneficial bacterial. Embodiments of the residence nano pods are the least powerful of the units, however the residence nano pods are less expensive to produce and may be deployed in greater numbers. Therefore numerous residence nano pods units may be placed in a treatment area cost effectively to increase overall coverage area of the system. Embodiments of the inventive residence pod systems are scalable and custom designed to each application, and may be used in small backyard ponds or lakes, regardless of the degree of salinity. All the residence units have an area of influence and by spacing these units within close enough proximity to other units a very potent and effective biosource augmentation treatment program is achieved. Embodiments of this combined system are a new and innovative approach to biosource augmentation in bodies of water.

Figure 1B:
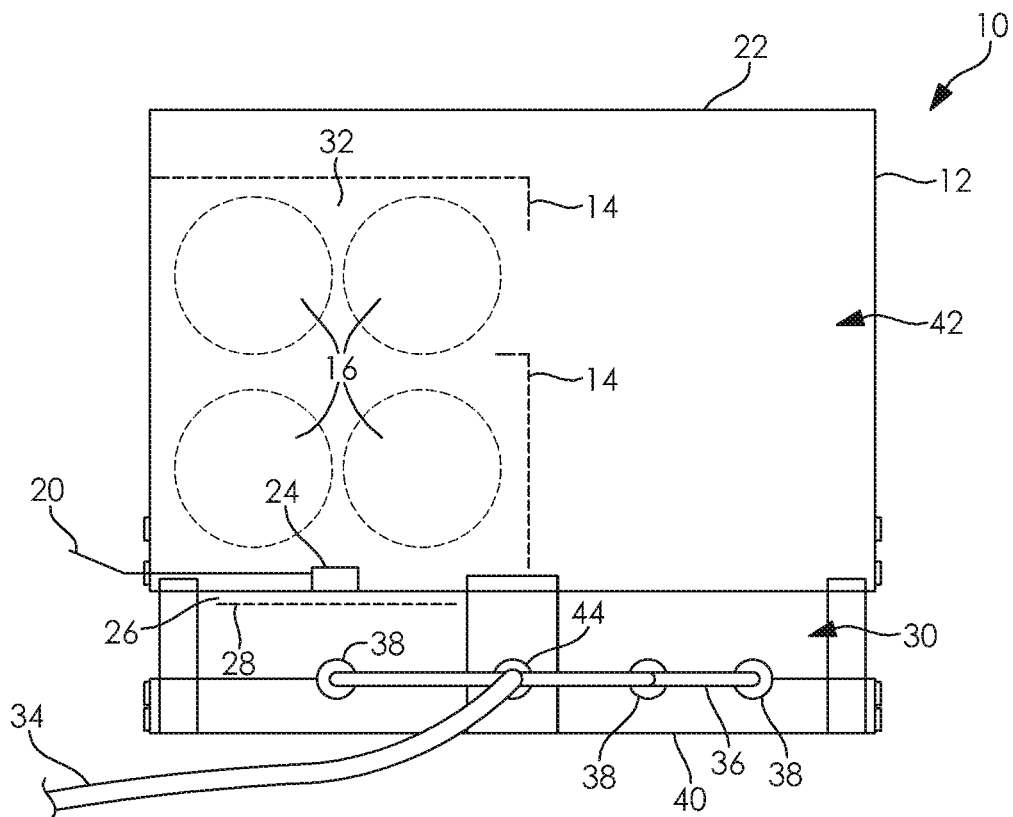
FIG. 1B is a side cutaway view of the residence pod shown in FIG. 1A in accordance with embodiments of the invention.
Figure 1C:
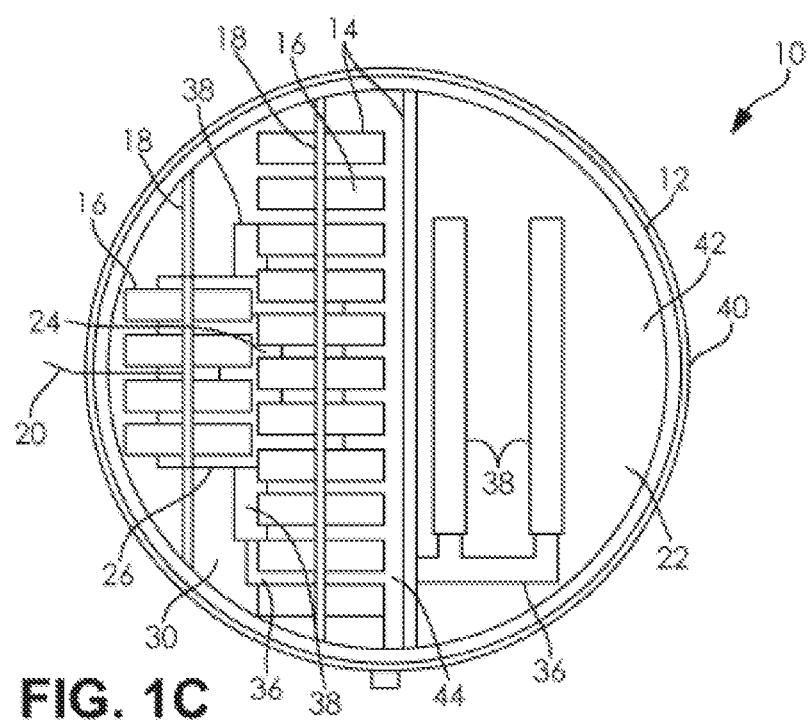
FIG. 1C is a top view of the residence pod shown in FIG. 1A in accordance with embodiments of the invention.
Figure 1D:
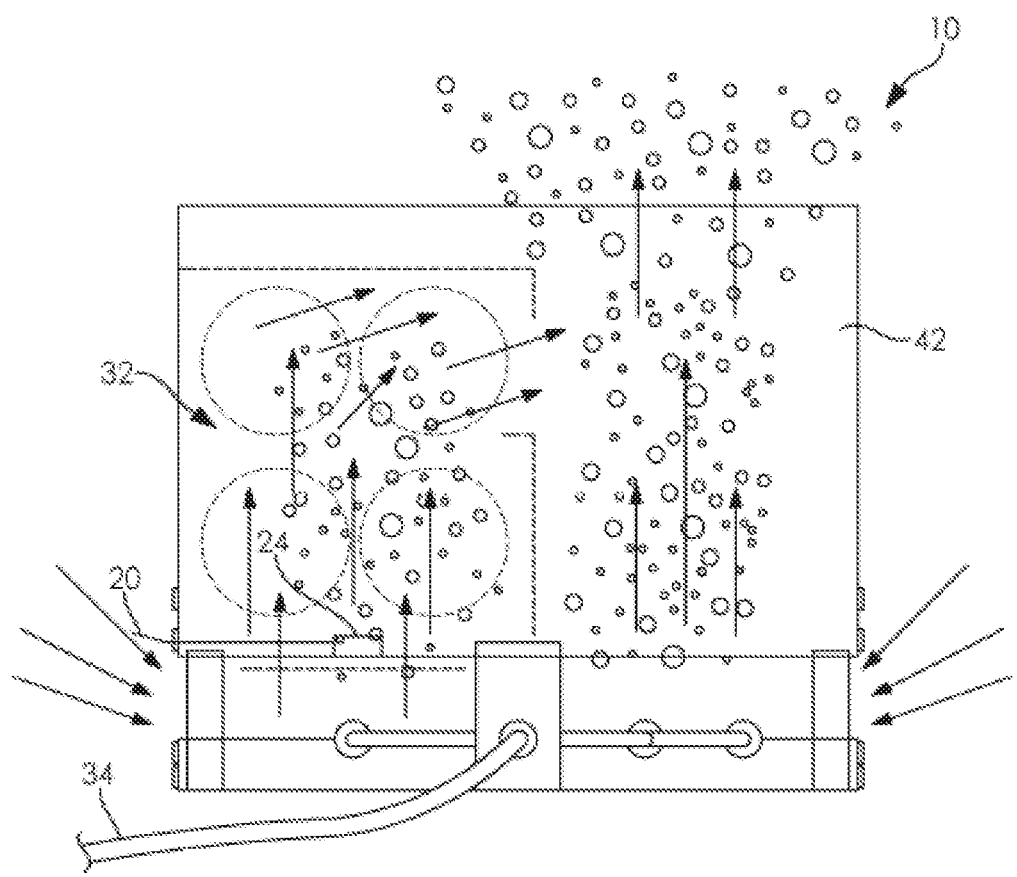
FIG. 1D is a side cutaway view of the residence pod shown in FIG. 1A showing water flow and air flow through the residence pod in accordance with embodiments of the invention.

Referring now to the figures, FIGS. 1A-1D illustrate an inventive embodiment of a residence pod 10 with a main housing 12, a base 40, and an open water intake 30. As best shown in FIGS. 1B and 1C, the main housing 12 of the residence pod 10 has a partition 14 that separates a grow chamber 32 from a flow chamber 42. The grow chamber 32 has a series of bacterial growth media 16 in the form of disks held by hanger rods 18. The bacterial growth media 16 provides an ideal place for both native beneficial bacteria as well as the bacteria traveling from other residence pods that are in the vicinity to grow. The disks of bacterial growth media 16 are spaced along the axis of the hanger rods 18 to allow water to flow between the disks 16 as shown by the arrows representing water flow in FIG. 1D. A tube 20 leads into the grow chamber 32 that delivers a liquid biosource blend from a peristaltic metering pump to a bacteria dose receptacle 24 that distributes the delivered biosource, such as bacteria to a bacteria cloth grow media 26 supported by a screen 28 positioned at the water intake 30 at the bottom of the residence pod 10. A flexible air tube 34 connected to an air compressor, located outside of the body of water where the pod 30 is being placed, feeds air into the residence pod 10 via an air control valve 44 and an air distribution tube 36, which may be formed of polyvinyl chloride (PVC), with outlets that supply air to a set of air diffusers 38. In some inventive embodiments, the tube is weighted to assure sitting on bottom. As best shown in FIG. 1D bubbles generated by the air outputted from the set of air diffusers 38 exit the open top outlet 22 of the residence pod 10. The bubbles from the air diffusers 38 move upward trough the flow and growth chambers and draw in water at the water intake 30 at the bottom of the residence pod 10. These bubbles deliver oxygen that promote bacteria growth in the grow media while creating a flow through of water. As this water flows through the residence pod unit 10, the water is treated by biosource in the grow chamber 32. This treated water, full of beneficial bacteria and oxygen, flows into the body of water.

Figure 2A:
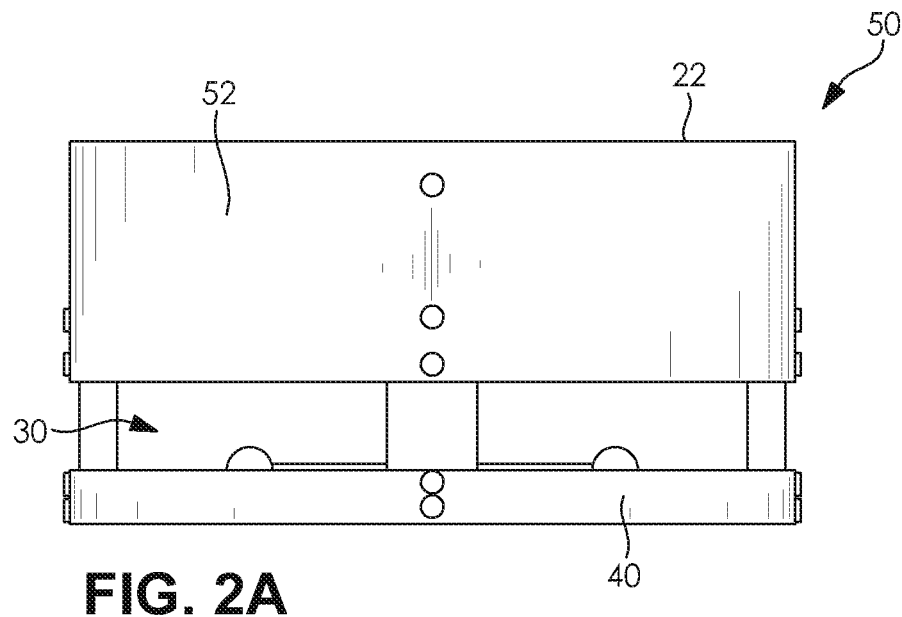
FIG. 2A is a side view of a residence air pod in accordance with embodiments of the invention.
Figure 2B:
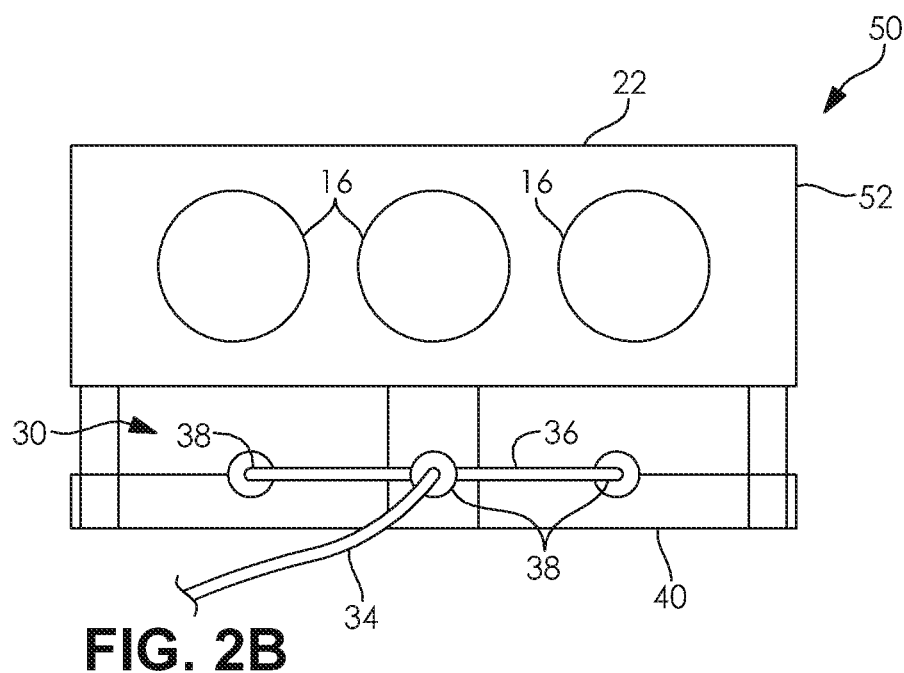
FIG. 2B is a side cutaway view of the residence air pod shown in FIG. 2A in accordance with embodiments of the invention.
Figure 2C:
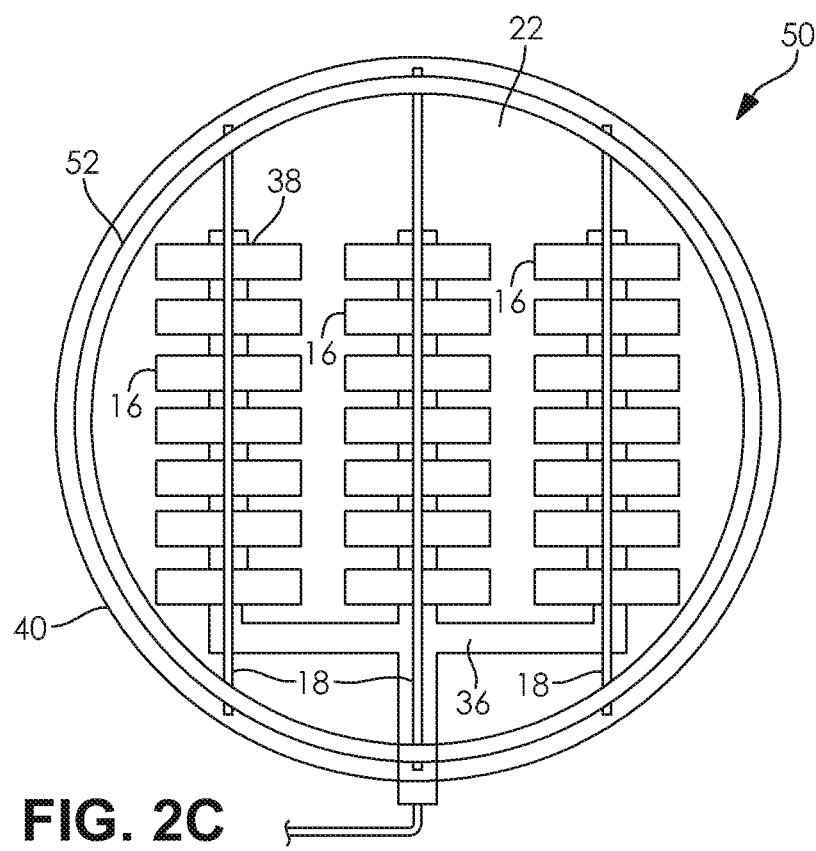
FIG. 2C is a top view of the residence air pod shown in FIG. 2A in accordance with embodiments of the invention.
Figure 2D:
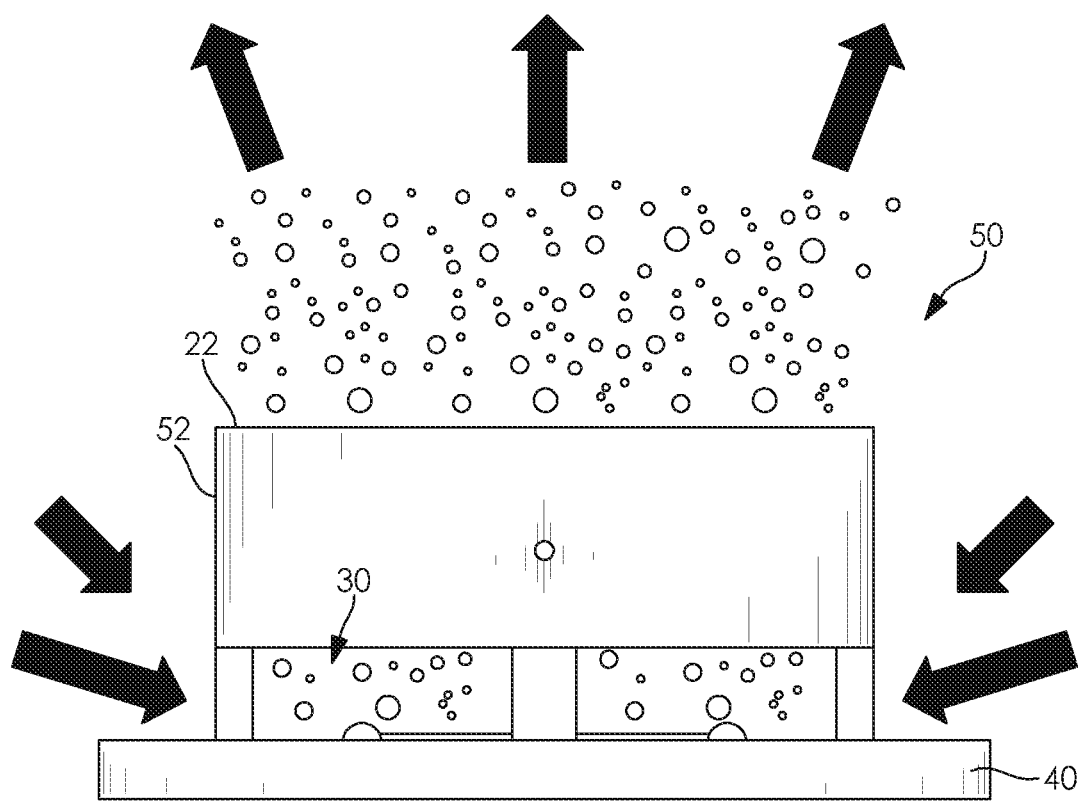
FIG. 2D is a side view of the residence air pod shown in FIG. 2A showing water flow and air flow in the form of bubbles through the residence air pod in accordance with embodiments of the invention.
Figure 2E:
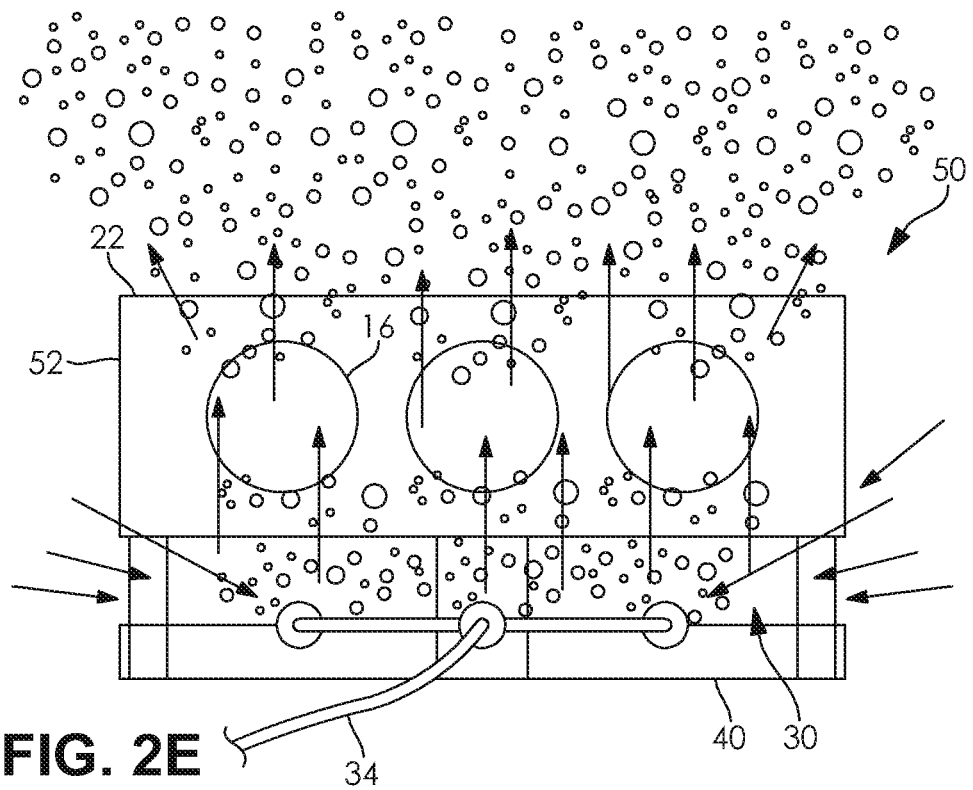
FIG. 2E is a side cut away view of the residence pod shown in FIG. 2A showing water flow and air flow in the form of bubbles through the residence air pod in accordance with embodiments of the invention.

FIGS. 2A-2E illustrate an inventive embodiment of a residence air pod 50 with a main housing 52, a base 40, an open water intake 30, and an open water outlet 22. As best shown in FIG. 1B the main housing 52 of the residence air pod 50 encloses a series of bacterial growth media 16 in the form of disks held by hanger rods or brackets 18. The bacterial growth media 16 provides an ideal place for both native beneficial bacteria as well as the bacteria traveling from other residence pods that are in the vicinity to grow. The disks of bacterial growth media 16 are spaced along the axis of the hanger rods or brackets 18 to allow water to flow between the disks 16 as shown by a set of arrows representing water flow in FIG. 2E. A flexible air tube 34 connected to an air compressor, located outside of the body of water in which the residence air pod 50 is placed, feeds air into the residence air pod 50 via an air distribution tube 36, which may be formed of polyvinyl chloride (PVC), with outlets that supply air to a set of air diffusers 38. As best shown in FIGS. 2D and 2E bubbles generated by the air outputted from the set of air diffusers 38 exit the open top outlet 22 of the residence air pod 50. These bubbles deliver oxygen that promote bacteria growth in the grow media while creating a flow through of water. As this water flows through the residence air pod unit 50, the water is treated by beneficial bacteria in the grow chamber 32. This treated water, full of beneficial bacteria and other biosource, if present, and oxygen, flows into the open water.

Figure 3A:
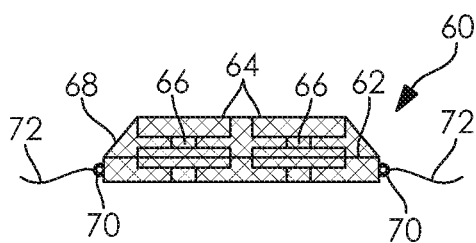
FIG. 3A is a side sectioned view of a residence nano pod in accordance with embodiments of the invention.
Figure 3B:
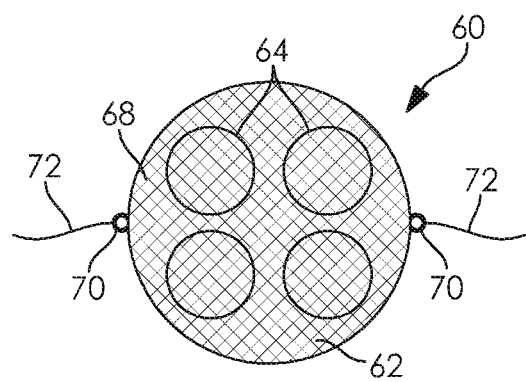
FIG. 3B is a top view of a residence nano pod in accordance with embodiments of the invention.

FIGS. 3A and 3B illustrate an inventive embodiment of a residence nano pod 60. A base tray 62 supports an array of bacterial growth media 64. In a specific inventive embodiment, the bacterial growth media 64 in the array are stacked in columns at least two high and are separated by spacers 66. A netting 68 attached to the base tray 62 encapsulates the bacterial growth media 64. A set of eye bolts 70 connected to opposing edges of the base tray 62 provide an attachment or connection point for a connector cable 72. In a specific inventive embodiment a plurality of residence nano pods 60 may be joined as a string of pods that may be laid along the bottom of a lake or pond.

Figure 4:
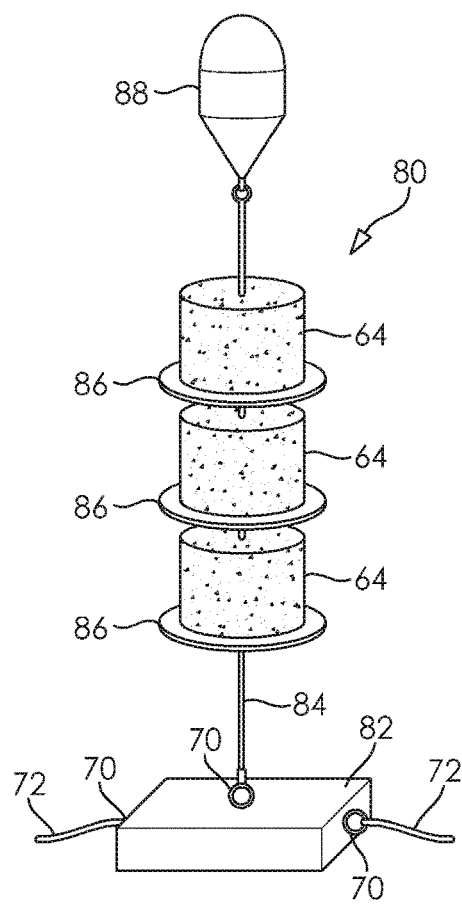
FIG. 4 is a side perspective view of a residence stringer pod in accordance with embodiments of the invention.
Figure 5:
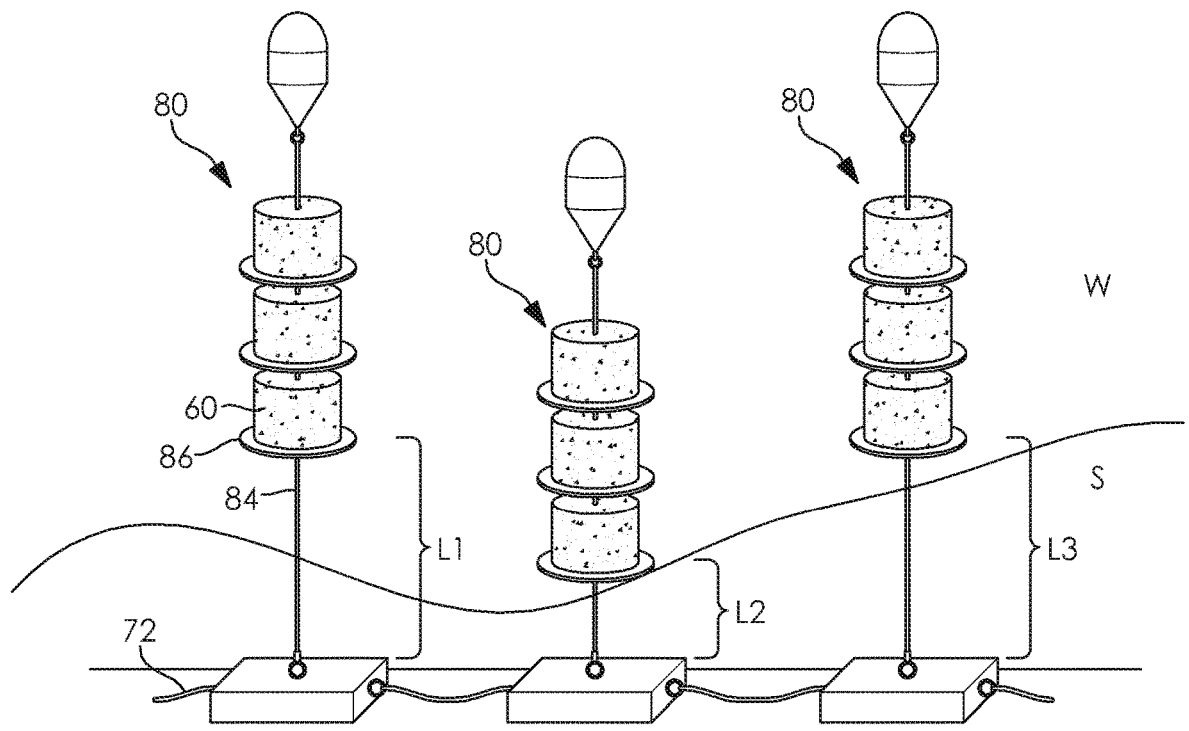
FIG. 5 illustrates the deployment of a series of residence stringer pods of FIG. 4 in a body of water in accordance with embodiments of the invention.

FIG. 4 illustrates an inventive embodiment of a residence stringer pod 80. The residence stringer pod 80 has a weighted base 82 with an eyebolt 70 extending upward from the center of the weighted base 82. A variable length extension line 84 has a proximal end secured to the weighted base and a distal end connected to a float 88. The float 88 pulls up on the extension line 84 toward a surface waterline when the float 88 is submerged under the waterline of a body of water in which the residence stringer pod 80 is placed. One or more media support plates 86 each holding bacterial growth media 64 are concentrically attached along the length of the extension line 84. The indigenous bacteria and the bacteria from other residence pods find, live, and grow in the growth media. Natural water flow provides oxygen, nutrients, and distributes the biosource. A mechanical fastener such as eye bolts 70 may be connected to opposing edges of the base tray 62 provide an attachment or connection point for a connector cable 72. In a specific inventive embodiment, a plurality of residence stringer pods 80 may be joined as a string of pods that may be laid along the bottom of a lake or pond as shown in FIG. 5, where three separate residence stringer pods 80 are resting on the hard bottom B of a pond or lake. The variable length (L1, L2, L3) of the extension lines 84 are adjusted so as to position the media support plates 86 that hold the bacterial growth media 64 above the muck layer of sediment S and decayed dead algae and position the bacterial growth media in the water W of the pond or lake, so that the bacteria can grow and distribute in the body of water.

Figure 6:
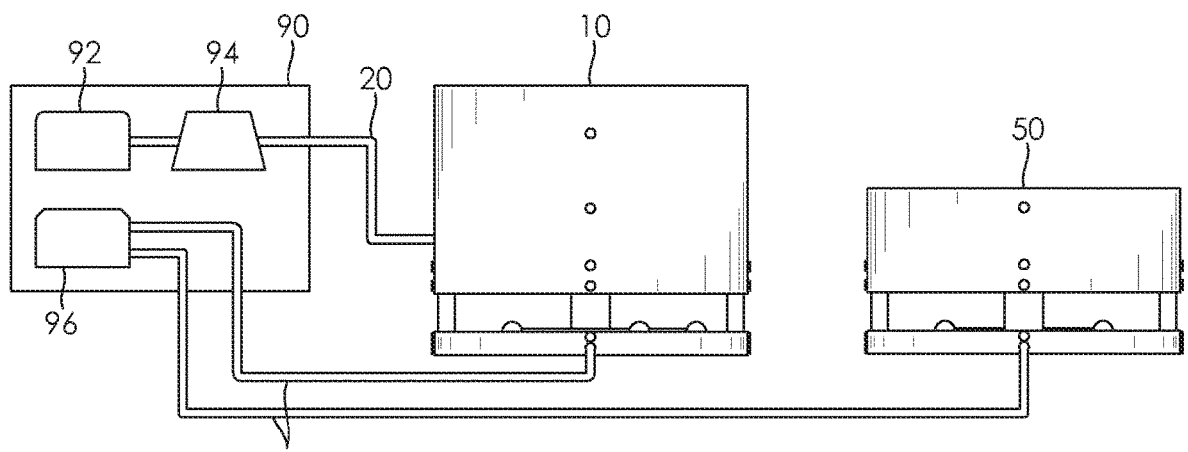
FIG. 6 is a functional block diagram of a residence pod system that illustrates the connections between pumps for air and beneficial biosources and a residence pod and a residence air pod in accordance with embodiments of the invention.

FIG. 6 is a functional block diagram of a residence pod system that illustrates the connections between a mechanical basin 90 and a residence pod 10 and a residence air pod 50. The mechanical basin 90 houses pumps for air 96 and beneficial biosource in a reservoir 92 distributed with a biosource pump 94 illustratively including a peristaltic metering or doser pump. The biosource pump 94 is connected to the residence pod 10 via tubing 20, while the air pump supplies air to the air diffusers 38 in the residence pod 10 and residence air pod 50 via flexible air tubes 34.

Figure 7:
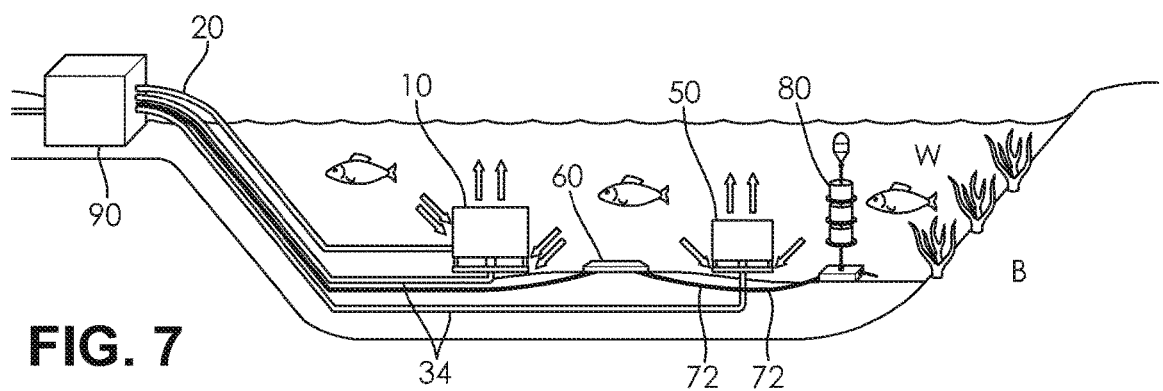
FIG. 7 is a cross sectional view of a residence pod system deployed in a pond or lake in accordance with embodiments of the invention.

FIG. 7 is a cross sectional view of a residence pod system deployed in a pond or lake. The residence pod system shown deployed includes a residence pod 10, a residence nano pod 60, a residence air pod 50, and a residence stringer pod 80. The residence nano pod 60 and the residence stringer pod 80 are both tethered together and are also tethered to the mechanical basin 90 with connector cable 72. The mechanical basin supplies air to the residence pod 10 and to the residence air pod 50 via flexible air tubes 34, and also supplies biosource to the residence pod 10 via tubing 20.

Figure 8:
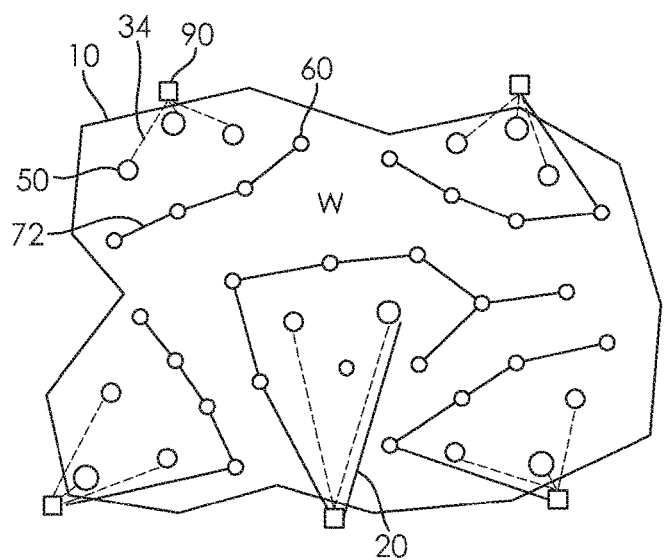
FIG. 8 is a top view of a deployment layout of a residence pod system in a pond or lake in accordance with embodiments of the invention.

FIG. 8 is a top view of a deployment layout of a residence pod system in a body of water W that may represent a pond or lake. In the specific inventive embodiment shown, five individual mechanical basins 90 are positioned along the perimeter of the body of water W and supplies both air and biosource via flexible air tubes 34 and tubing 20, respectively to the five residence pods 10. The five individual mechanical basins 90 also supply air via flexible air tubes 34 to the residence air pods 50 associated with each mechanical basin 90. Groups of tethered residence nano pods 60 are formed with connector cables 72, and an individual group of residence nano pods 60 are tethered to each of the five mechanical basins 90 with connector cable 72.

Figure 9:
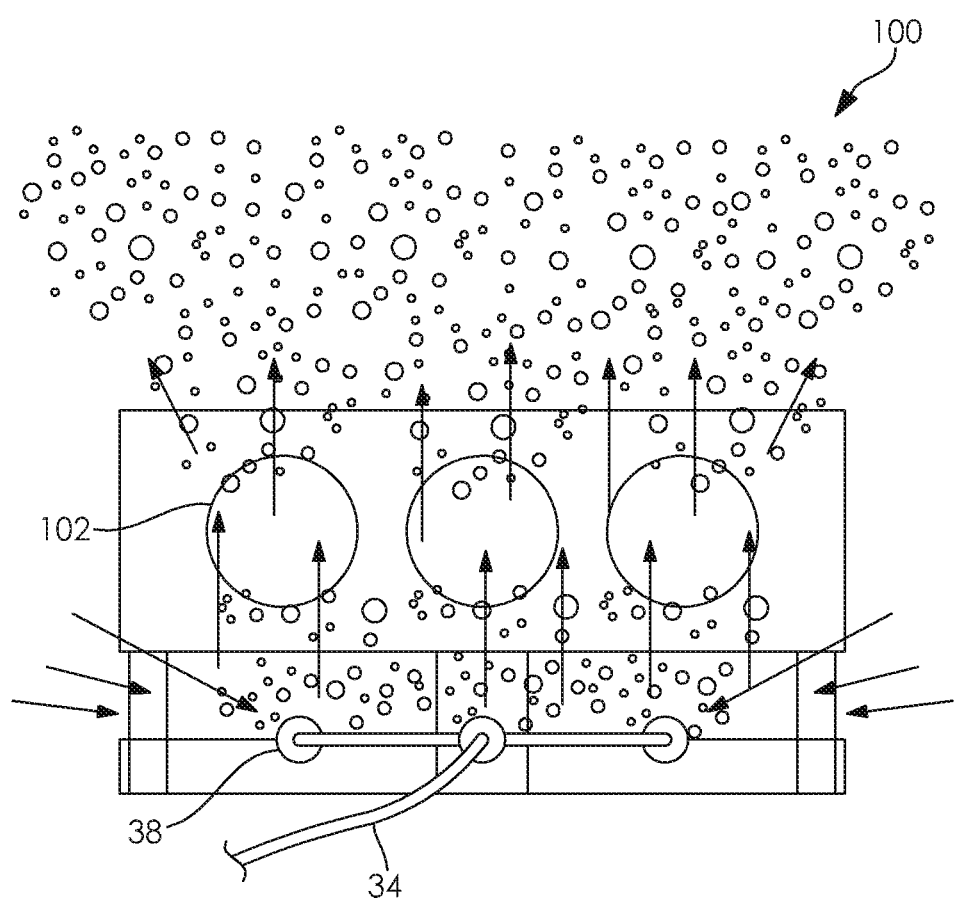
FIG. 9 is a side sectioned view of a residence pod with time release containers of biosource in accordance with embodiments of the invention.

FIG. 9 illustrates an inventive embodiment of a residence pod 100 with one or more time release containers 102 holding beneficial bacteria that are distributed via the water flow produced by the bubbles generated by the air diffusers 38. The use of time release containers eliminates the need for a peristaltic metering pump to supply biosource to the pod.

FIG. 10 illustrates another inventive embodiment of a residence pod 10' with a main housing 12', a base 40', and an open water intake 30' in which primed numbers have the meaning ascribed to the corresponding base number. A deflector lid 103 in a circular form directs flow all around and comes off to provide easy access to remove and replace a biosource cartridge. In some inventive embodiments, the deflector lid 103 includes a eyelet 104 to facilitate usage for mooring of other components or the lift removal of the unit. In still other embodiments, a weighted bottom mount base 106 is provided that is coupled to base 40' or used in place thereof. The weighted base being formed of cement, metals such as iron, or composites. In some inventive embodiments, the base 106 includes at least one eyelet 108.

FIG. 11 is a perspective view a cartridge 110 adapted to contain bacteria grow media 64 and in some inventive embodiments has a grip cutout 112 and apertures 114 for water flow therethrough. The cartridge 110 is adapted to fit within complementary openings in the residence pod 10 or 10'. Biosource cartridges 110 are used in place of, or in combination with a reservoir 92 and are amenable to submerged placement and subject to a replacement schedule (annually, bi-annually, etc. . . . ). In instances when the biosource is slow release bacteria, the need for liquid bacteria dosing is reduced as well as nutrition therefore and allows for the end users to install and buy recharge kits.

Figure 12B:
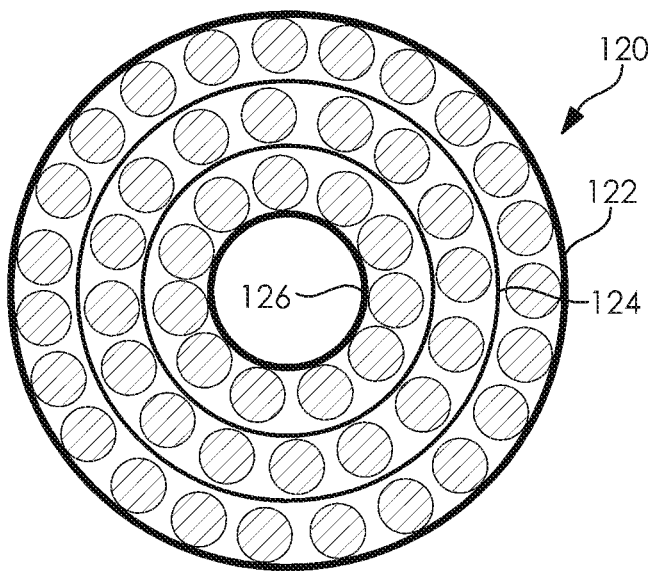

FIG. 12A is a side view of a circular array 120 of media to support bacteria grow media 64. The constituent cartridges 122 are bundled with an open mesh wire 124 amenable to submersion. FIG. 12B is a top view of the array 120. A central hole 126 is provide in some inventive embodiments to provide for seeding biosource material. The array 120 is modular and can be stacked with other such arrays 120' to adjust the volume of bacteria grow media present, as shown in FIG. 12A. While only a single additional array 120' is shown, it is appreciated that any such number can be stacked. While depicted with three annular rings of cartridges, it is appreciated that from 1 to 10 such rings of cartridges are readily provided.

Figure 13A:
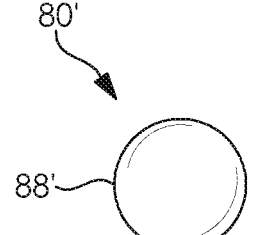
FIG. 13A is a side perspective view of a residence stringer pod in accordance with another embodiment of the invention.
Figure 13A:
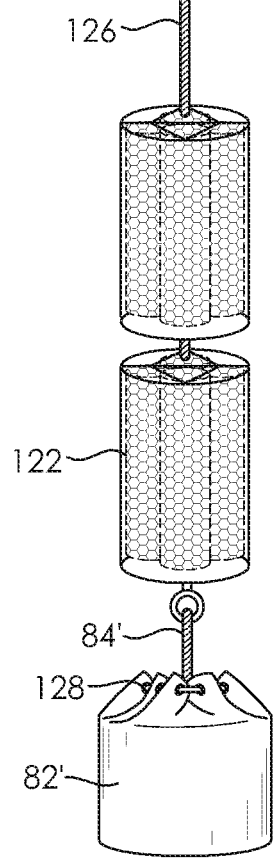
Figure 13B:
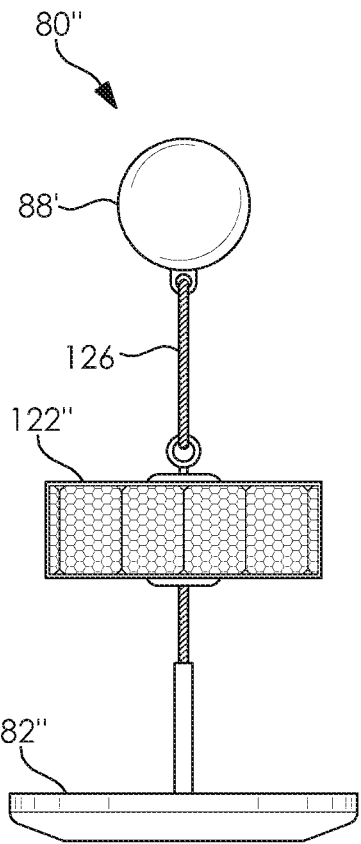
FIG. 13B is a side perspective view of a residence stringer pod in accordance with still another embodiment of the invention.

FIGS. 13A and B illustrates other inventive embodiment of a residence stringer pod, shown generally at 80' and 80" that have weighted bases 82' and 82', respectively. Weighted base 82' is formed as a bag with a synched rope 128 extending from the weighted base 82' in which primed numbers have the meaning ascribed to the corresponding base number. Weighted base 82" is cast metal, cement, or aggregate. A variable length extension line 84' has a proximal end secured to the weighted base and a distal end connected to a float 88'. One or more media support cartridges 122 or short versions thereof 122' are concentrically attached along the length of the extension line 84.

Figure 14A:
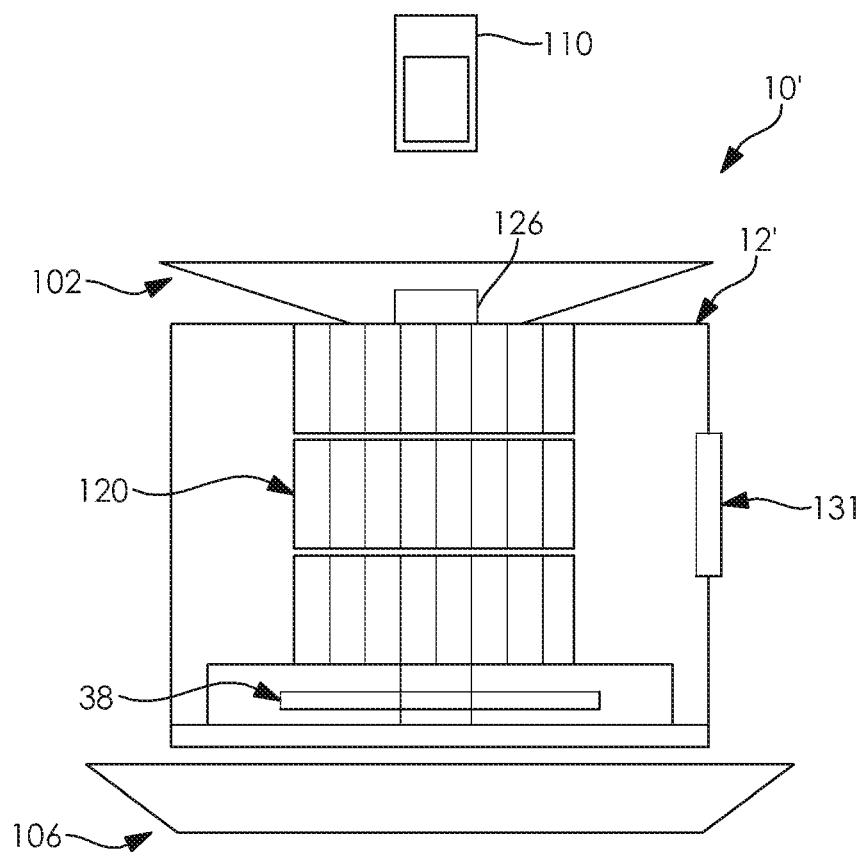
FIG. 14A is a partial cutaway side view of the residence pod of FIG. 10.
Figure 14B:
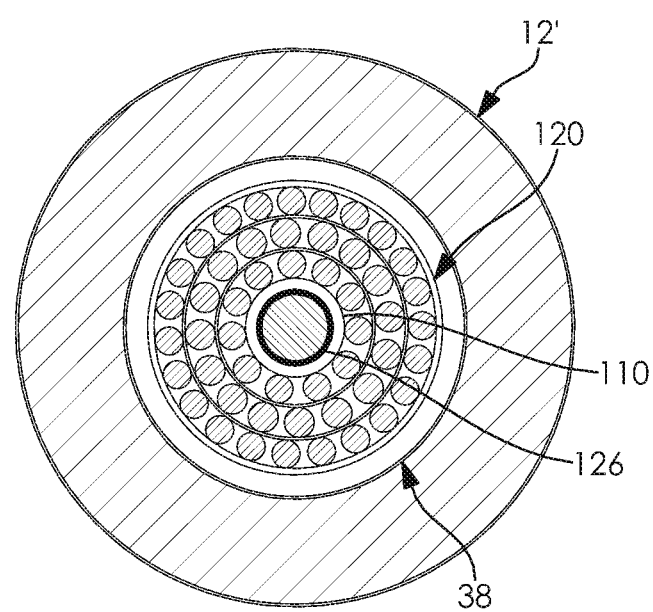
FIG. 14B is a top view of the residence pod of FIG. 14A with the deflector lid removed for visual clarity.

FIGS. 14A and 14B illustrates is a partial cutaway view of a residence pod 10' with a main housing 12', abase 40', and an open water intake 30'. Three of the arrays 120 are stacked therein. A cartridge 110 containing a biosource is adapted to seat within the aperture 126. The deflector lid 103 in a circular form directs flow all around and comes off to provide easy access to remove and replace a biosource cartridge. A mounting plate 131 is provided to facilitate securement. Other reference numerals have the meaning ascribed thereto with respect to previously detailed drawings.

OTHER EMBODIMENTS

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient roadmap for implementing the exemplary embodiment or exemplary embodiments. It should be understood that various changes may be made in the function and arrangement of elements without departing from the scope as set forth in the appended claims and the legal equivalents thereof.

The invention claimed is:

1. A modular system for aeration and biosource augmentation of a body of water, said system comprising:
   one or more mechanical basins comprising an air compressor, a liquid biosource reservoir, and a metering pump to supply doses of the biosource from the liquid biosource reservoir, the one or more mechanical basins located outside the body of water;
   one or more residence pods comprising a housing with an open top and a partition therein that separates a grow chamber from a flow chamber, the one or more residence pods configured to be submerged in the body of water, to aerate the body of water, to be in fluid communication with the air compressor via a first set of tubes, to receive into the grow chamber biosource from the liquid reservoir via a second set of tubes, and perform at least one of: dose beneficial biosource, host biosource, or provide biosource to the body of water; and at least one of:

one or more residence air pods configured to be submerged in the body of water configured to aerate the body of water, to be in fluid communication with the air compressor via the first set of tubes, and perform at least one of: host beneficial bacteria or provide beneficial bacteria to the body of water, and one or more residence nano pods configured to be submerged in the body of water and configured to host beneficial biosource;

wherein the biosource is selected from a group consisting of microorganisms, insect larvae, enzymes, nutrients not including phosphates to promote bacterial growth, or a combination thereof.

2. The system of claim 1 wherein the doses of the biosource are supplied at set intervals.

3. The system of claim 1 wherein said one or more residence pods further comprise:

a base connected to a lower portion of said housing and an open water intake between said base and said housing;

a series of bacterial growth media held by a set of hanger rods in said grow chamber;

an air distribution tube having an inlet connected to the air compressor in said mechanical basin via the first tube and a set of outlets connected to a set of air diffusers positioned below said grow chamber and said flow chamber; and a dose receptacle that is connected to the peristaltic metering pump in said mechanical basin via the second tube that supplies a liquid of biosource to a bacterial cloth growth media supported by a screen positioned at said water intake below said grow chamber.

4. The system of claim 3 wherein said series of bacterial growth media are a set of disks spaced along the axis of the hanger rods.

5. The system of claim 1 wherein said one or more residence air pods further comprise:

a housing with an open top and a flow chamber;

a base connected to a lower portion of said housing and an open water intake between said base and said housing;

a series of bacterial growth media held by a set of hanger rods in said flow chamber; and an air distribution tube having an inlet connected to the air compressor in said mechanical basin via a tube and a set of outlets connected to a set of air diffusers positioned below said flow chamber.

6. The system of claim 5 wherein said series of bacterial growth media are a set of disks spaced along the axis of the hanger rods.

7. The system of claim 1 wherein said one or more residence nano pods further comprise:

a base tray that supports an array of bacterial growth media;

a netting attached to the base tray that encapsulates the array of bacterial growth media; and a mechanical fastener secured to said base tray to provide an attachment point for a connector cable.

8. The system of claim 7 wherein said array of bacterial growth media are stacked in columns at least two high and are separated by a set of spacers.

9. The system of claim 1 further comprising a residence stringer pod, said residence stringer pod further comprising:

a weighted base with a top eye bolt extending upward from the center of the weighted base;

a variable length extension line with a proximal end secured to the top eyebolt and a distal end connected to a float that pulls up on the extension line toward a surface waterline when the float is submerged under the waterline of a body of water in which the residence stringer pod is placed; and one or more media support plates each holding a bacterial growth media that are concentrically attached along a length of the extension line.

10. The system of claim 9 further comprising a second mechanical fastener on said weighted base that provides a connection point for a connector cable; and wherein a plurality of residence stringer pods may be joined as a string of residence stringer pods.

11. The system of claim 1 wherein said residence pod further comprises one or more time release containers holding biosource.

12. The system of claim 1 wherein the fluid communication is only aeration.

13. The system of claim 1 wherein said biosource is bacteria.

14. The system of claim 1 wherein said biosource is bacteria provided in a cartridge in at least one of said residence pod or said residence air pod.

15. The system of claim 1 further comprising a modular array of media.

16. A method of using the system of claim 1 to prevent or eliminate an algal bloom in a water body comprising:

positioning said one or more mechanical basins along the outside of the water body;

connecting said one or more residence pods to said one or more mechanical basins with the first set of one or more tubes for supplying air and the second set of one or more tubes for supplying biosource to the residence pods;

connecting said one or more residence air pods to said one or more mechanical basins with the first set of one or more tubes for supplying air to the residence air pods; and submerging said one or more residence pods and said one or more residence air pods in the body of water.

17. The method of claim 16 further comprising submerging one or more of said residence nano pods; and
wherein when there are more than one of said residence nano pods, joining the two or more of said residence nano pods with a set of connector cables to form a string of said residence nano pods prior to submerging said residence nano pods.

18. The method of claim 16 further comprising deploying one or more of a residence stringer pods.

19. The method of claim 18 further comprising adjusting a variable length extension line extending from each of a weighted base of said one or more residence stringer pods to extend one or more media support plates each holding bacterial growth media that are concentrically attached along the length of the extension line above muck or sediment in the water body.

\* \* \* \* \*